United States Patent
Rhodes

(10) Patent No.: US 9,847,040 B2
(45) Date of Patent: Dec. 19, 2017

(54) STRING INSTRUMENT CHORD TEACHING DEVICE AND METHOD

(71) Applicant: Jeffrey Rhodes, Hollidaysburg, PA (US)

(72) Inventor: Jeffrey Rhodes, Hollidaysburg, PA (US)

( * ) Notice: Subject to any disclaimer, the term of this patent is extended or adjusted under 35 U.S.C. 154(b) by 0 days.

(21) Appl. No.: 14/920,066

(22) Filed: Oct. 22, 2015

(65) Prior Publication Data

US 2016/0125752 A1    May 5, 2016

Related U.S. Application Data

(60) Provisional application No. 62/072,110, filed on Oct. 29, 2014.

(51) Int. Cl.
| | |
|---|---|
| *G09B 15/02* | (2006.01) |
| *G09B 15/00* | (2006.01) |
| *G10D 3/06* | (2006.01) |
| *G10G 1/02* | (2006.01) |

(52) U.S. Cl.
CPC ............. *G09B 15/003* (2013.01); *G10D 3/06* (2013.01); *G10G 1/02* (2013.01)

(58) Field of Classification Search
CPC ......... G09B 15/003; G09B 15/06; G10G 1/02
USPC .................................................. 84/471 R, 293
See application file for complete search history.

(56) References Cited

U.S. PATENT DOCUMENTS

| | | | | | |
|---|---|---|---|---|---|
| 3,273,439 | A | * | 9/1966 | Keefe | G10D 3/06 |
| | | | | | 84/314 R |
| 3,403,590 | A | * | 10/1968 | Quinton | G09B 15/06 |
| | | | | | 84/314 R |
| RE31,019 | E | * | 8/1982 | Evangelista | G10H 1/342 |
| | | | | | 84/702 |
| 8,878,035 | B2 | * | 11/2014 | Stenbroten | G10D 3/043 |
| | | | | | 84/317 |

* cited by examiner

*Primary Examiner* — Jianchun Qin
(74) *Attorney, Agent, or Firm* — Panitch Schwarze Belisario & Nadel LLP

(57) ABSTRACT

A device and methods are disclosed for teaching a student string instruments, specifically for teaching chords of a string instrument. The invention also relates to a kit of more than one string instrument chord teaching device and methods to allow simultaneously teaching more than one student chords of a string instrument. For more than one string instrument chord teaching device in the kit, the string instrument chord teaching devices may further be visibly distinguishable from each other.

22 Claims, 7 Drawing Sheets

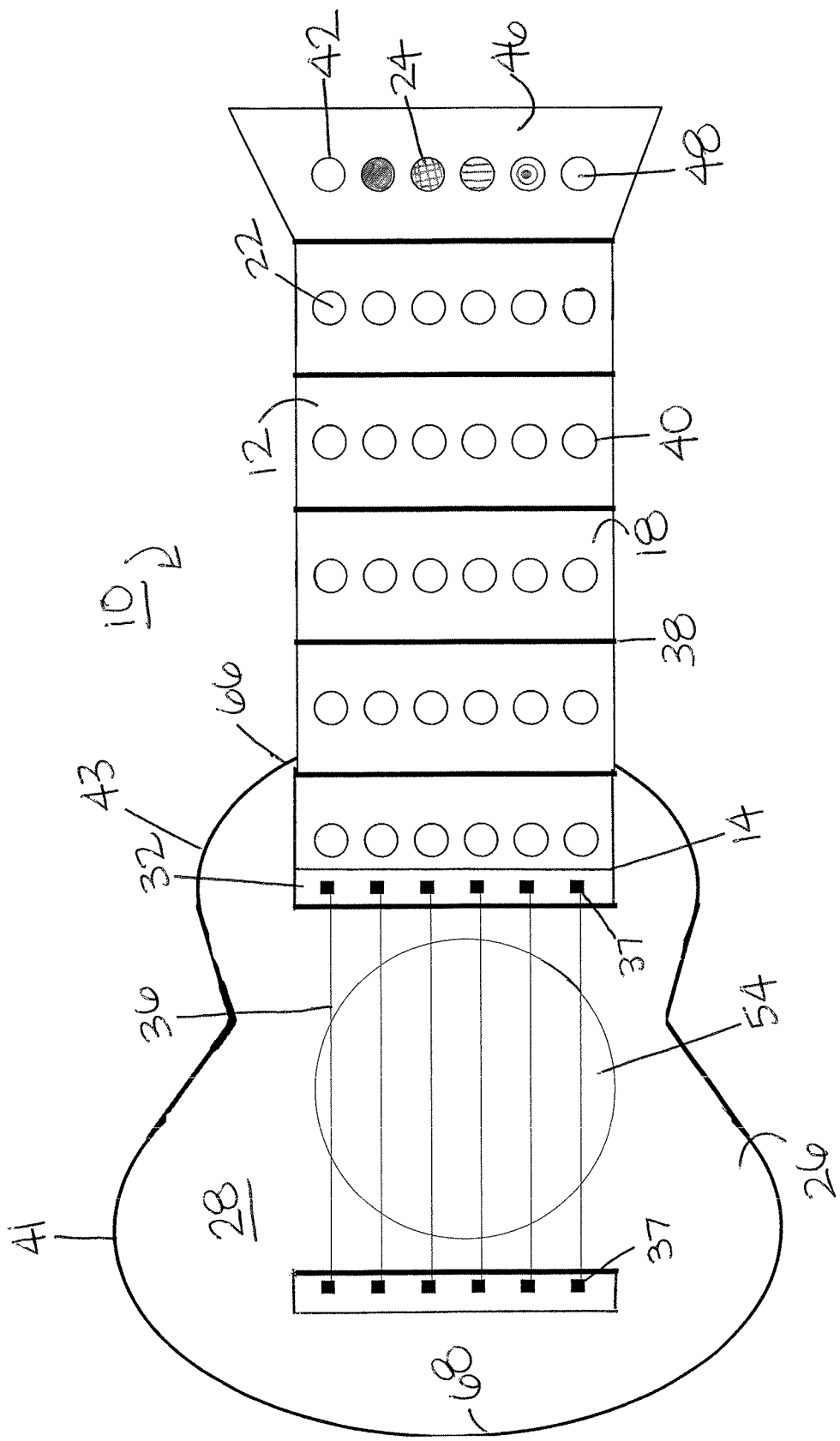

STRING INSTRUMENT CHORD TEACHING DEVICE AND METHOD

CROSS REFERENCE TO RELATED APPLICATIONS

This application is entitled to priority pursuant to 35 U.S.C. §119(e) to U.S. Provisional Patent Application No. 62/072,110, filed Oct. 29, 2014, the disclosure of which is hereby incorporated by reference herein in its entirety.

BACKGROUND OF THE INVENTION

When learning to play a musical instrument, a student is taught how to play using the characteristics of the particular instrument. When learning to play a string instrument with a neck portion, for example a guitar, bass guitar, banjo, ukulele, mandolin and even a cello, double bass, violin or viola, a beginning step often is to learn how to strum, pluck or bow the strings over a body portion of the instrument with one hand while depressing appropriate strings with fingers of the other hand at the correct locations along the neck portion to play or "finger" chords, harmonic intervals or single notes. Fingering chords often requires hand placement that may seem awkward to the student at first. Becoming comfortable with hand and finger placement will generally require practice by the student in order to become proficient at playing the musical instrument.

Once becoming comfortable with the placement of the fingers to finger the chords, it may further be advantageous for the student to memorize the hand and finger placement specific to chords, at least the more common chords. Memorization, including "muscle memory" by which there is an almost automatic correct fingering of the chords without having to consciously think through the placement of each finger to form the appropriate chord, will allow the student to focus on correctly reading or otherwise playing the music, rather than concentrating deliberately on correct finger placement for each chord.

With practice, the chords will become more familiar and the student will be able to switch hand and finger placement with the agility that is often necessary for playing the musical instrument. It would thus be advantageous to provide the student with a device and method specific for learning comfortable and rapid finger placement for at least the more common chords of a string instrument, such as those further described in the following sections.

BRIEF SUMMARY OF THE INVENTION

The invention relates to a device and methods for teaching string instruments, specifically for teaching chords of a string instrument. Accordingly, one general aspect of the invention relates to a string instrument chord teaching device comprising:

(i) a neck member having a proximal end and a distal end, a front surface and a back surface, (ii) holes in the front surface of the neck member arranged in an array of rows and columns corresponding to possible finger placement by a user to finger chords, and (iii) pegs capable of being frictionally retained in and removable from the holes, each peg being identifiable with a finger for fingering the chord.

Preferably, the string instrument chord teaching device further comprises a body portion resembling a string instrument and a chord chart. The invention also provides a kit comprising more than one string instrument chord teaching device, and a chord chart for each string instrument chord teaching device.

Yet another general aspect of the invention relates to a method of teaching chords for a string instrument to at least one student comprising:

(a) providing the student with a string instrument chord teaching device, (b) providing the student with a chord chart of one or more chords, the chord chart comprising indicators for proper finger placement by the student to finger chords, each indicator being identifiable with a peg, (c) instructing the student to place pegs in the holes in the neck member, corresponding to the proper peg placement as shown in the chord chart to finger a chord, and (d) instructing the student to place a finger over each peg, each peg being identifiable with a finger, such that the placement of the fingers over the pegs corresponds to correctly fingering the chord.

In one embodiment of the invention, more than one student are taught chords for a string instrument, each student being provided with a string instrument chord teaching device and a chart of one or more chords. Further, the string instrument chord teaching devices may be visibly distinguishable from each other.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 5 is a front elevation view of a string instrument chord teaching device, wherein pegs are stored in holes in the head portion of the string instrument chord teaching device;

DETAILED DESCRIPTION OF THE INVENTION

Figure 1:
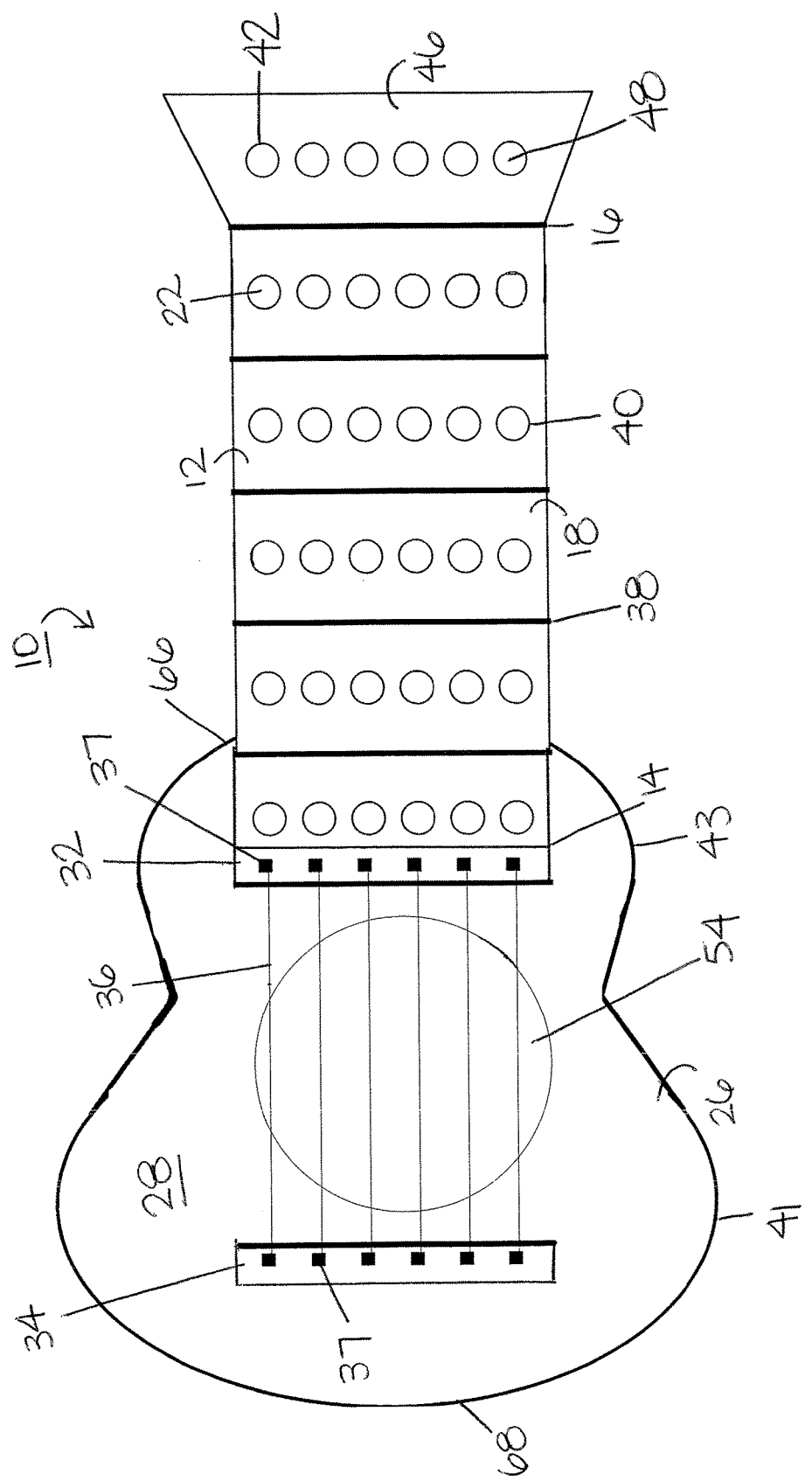
FIG. 1 is a front elevation view of a string instrument chord teaching device.

Unless otherwise defined, all technical and scientific terms used herein have the same meaning as commonly understood to one of ordinary skill in the art to which this invention pertains. Otherwise, certain terms used herein have the meanings as set forth in the specification.

As used herein and in the appended claims, the singular forms "a," "an," and "the" include plural references unless the context clearly dictates otherwise.

As used herein, the term "chord" means not only a musical chord, wherein three or more notes are played together, but also the appropriate fingering for two notes played together (known as a "harmonic interval") and for a single note on a single string of a string instrument.

The term "proper finger placement," as used with reference to the invention described herein, specifically refers to finger placement on the neck member of a string instrument that would allow a user to play the correct notes corresponding with a desired chord. Proper finger placement may be designed for a right handed user or a left handed user. As shown herein in the drawings, the more typical right handed arrangement is shown where the fingers of the left hand form the chords along a neck member of the teaching device.

The various embodiments of the invention will now be described with reference to the drawings, wherein like numerals indicate like elements throughout the several views.

One general aspect of the invention relates to a string instrument chord teaching device, also referred to herein as "teaching device." One embodiment of the teaching device is represented in FIGS. 1-5 as teaching device 10 that is in the general shape of a classical guitar as only one example of a musical instrument teaching device according to the present invention. The teaching device 10 comprises a neck member 12 having a proximal end 14 and a distal end 16, a front surface 18 and a back surface 20. The teaching device 10 may be made from wood, such as plywood, or molded polymeric plastic material.

As best shown in FIGS. 1, 4B, 5 and 6, holes 22 are formed in the front surface 18 of the neck member 12 by drilling or by molding when the neck member 12 is formed, and are arranged in an array of rows 40 and columns 42 corresponding to possible finger placement by a user to finger chords.

FIG. 1 is a front elevation view of one embodiment of the teaching device 10. The holes 22 on the front surface 18 of the neck member 12 are arranged in an array of rows 40 and columns 42, wherein the holes correspond to possible finger placement by a user to finger a string instrument chord. Columns 42 are comprised of holes 22 extending from the proximal end 14 to the distal end 16 of the neck member 12. In a preferred embodiment, columns 42 represent simulated string locations. If desired, simulated string locations may be printed or painted on the neck member 12 to align with the holes 22 in the columns 42. Rows 40 are arranged perpendicularly to the columns 42, and represent locations for fingering different notes along a simulated string. The number of columns corresponds to the number of string locations for a particular string instrument that the student is learning to play. For example, there are six strings for a typical guitar, four or five for a bass guitar or banjo, four for a ukulele, etc. The spacing of the rows 40, the columns 42 and the holes 22 preferably corresponds to the spacing that would be appropriate for the string instrument of interest.

In various embodiments, such as those shown in FIGS. 1, 3, 4B, 5 and 6, the teaching device 10 may further comprise at least one fret 38 on the front surface 18 of the neck member 12. The frets 38 may be integrally and unitarily formed, as by molding, on and extend from the front surface 18 of the neck member 12 or may be separately attached to the neck member 12 with adhesive, nails or any other means for attaching frets 38 to the front surface 18 of the neck member 12. Additionally, the frets 38 may be printed or painted or otherwise marked lines on the neck member 12, or partially embedded into the neck member 12, in a manner like an actual guitar's frets are embedded in the guitar's neck.

Figure 3:
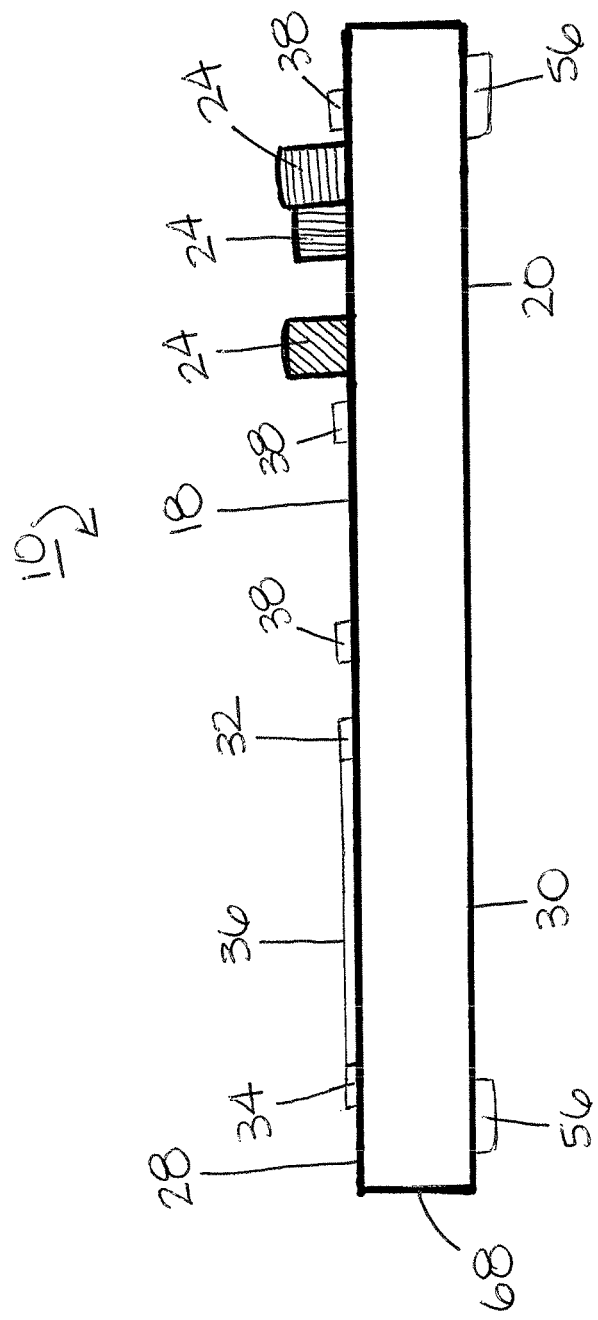
FIG. 3 is a side elevation view of a string instrument chord teaching device.

Pegs 24 are provided where the pegs are capable of being frictionally retained in and removable from the holes 22. Each peg 24 is identifiable with a finger for fingering a particular chord being learned. In a preferred embodiment of the invention, the pegs 24 are physically distinguishable, and each peg corresponds to a specific finger. For example, a teaching device 10 may comprise four pegs, wherein a red peg corresponds to a pointer finger, for example, a blue peg corresponds to a ring finger, for example, a green peg corresponds to a middle finger, for example, and a yellow peg corresponds to a pinky finger, for example. Another peg (not shown), for instance a black peg, could be provided to correspond to a thumb, for example, if desired. While visual differentiation of the pegs corresponding to particular fingers, such as by colors is shown as an exemplary manner of distinguishing the pegs 24, other modes of differentiation may be by other visual aspects or tactile aspects, such as, for example without limitation, size, height, texture of a top surface, cross-sectional shape, material, or printed pattern. FIG. 3 is a side elevation view of one embodiment of the teaching device 10, wherein the pegs 24 are placed in the holes 22 and are distinguished by pattern.

Further, the pegs 24 are capable of being frictionally retained and removable from the holes 22. In a preferred embodiment, the pegs 24 and the holes 22 are cylindrical tubes that may be made of polyvinyl chloride (PVC), however the pegs and holes may be any shape and need not all be the same shape. The pegs 24 may be made of any material capable of being frictionally retained in and removable from the holes 22. For example, the pegs 24 may be any other polymeric plastic, wood, metal, rubber, or other materials with differing degrees of elasticity or no elasticity. The pegs 24 may be solid or hollow, such as the tubes mentioned above, and may have an inverted truncated conical shape with the wider base at the top, so that as the material of the pegs and the material of the neck member 12 forming the holes 22 wear, the pegs will still be able to be frictionally and removably retained in the holes 22.

It is only necessary that the teaching device 10 include a neck member 12 and need not have a body portion connected to or preferably formed as an integral and unitary component of the teaching device 10 with the neck member 12, since a student or other user only needs to know the location of finger placement on a neck member of a string instrument to finger chords. However, to add some degree of at least simulated realism to the appearance of the teaching device 10, it is preferred that a body portion 26 of the teaching device is formed adjacent the proximal end 14 of the neck member 12. The body portion may be integrally and unitarily formed with the neck member 12, such as by molding or when the shape of the teaching device is cut from wood, such as a plank or plywood.

The teaching device 10 may and preferably does further comprise a body portion 26 having a first end 66 and a second end 68. Preferably, the body portion 26 is adjacent to the proximal end 14 of the neck member 12. The body portion 26 may further be configured to resemble a string instrument of choice. For example, the body portion 26 as shown in the embodiments depicted in FIGS. 1-5 resembles a six string classical acoustic guitar. There are many shapes even of guitars that the body 26 can simulate, such as often seen in electric guitars with cutaways to allow the user to readily reach the first and sixth strings at the terminus of the proximal end of the neck portion 26. As mentioned above, a body portion, while at least aesthetically desirable, is not necessary for the teaching device 10 of the present invention. Therefore, the shape of the body portion 26, when present, is entirely open to any shape at all.

In one embodiment, the teaching device may be used for teaching chords of a guitar. In other embodiments, the teaching device may be used for teaching chords of other string instruments including, but not limited to, bass guitar, banjo, ukulele, mandolin and even a cello, double bass, violin or viola.

Figure 6:
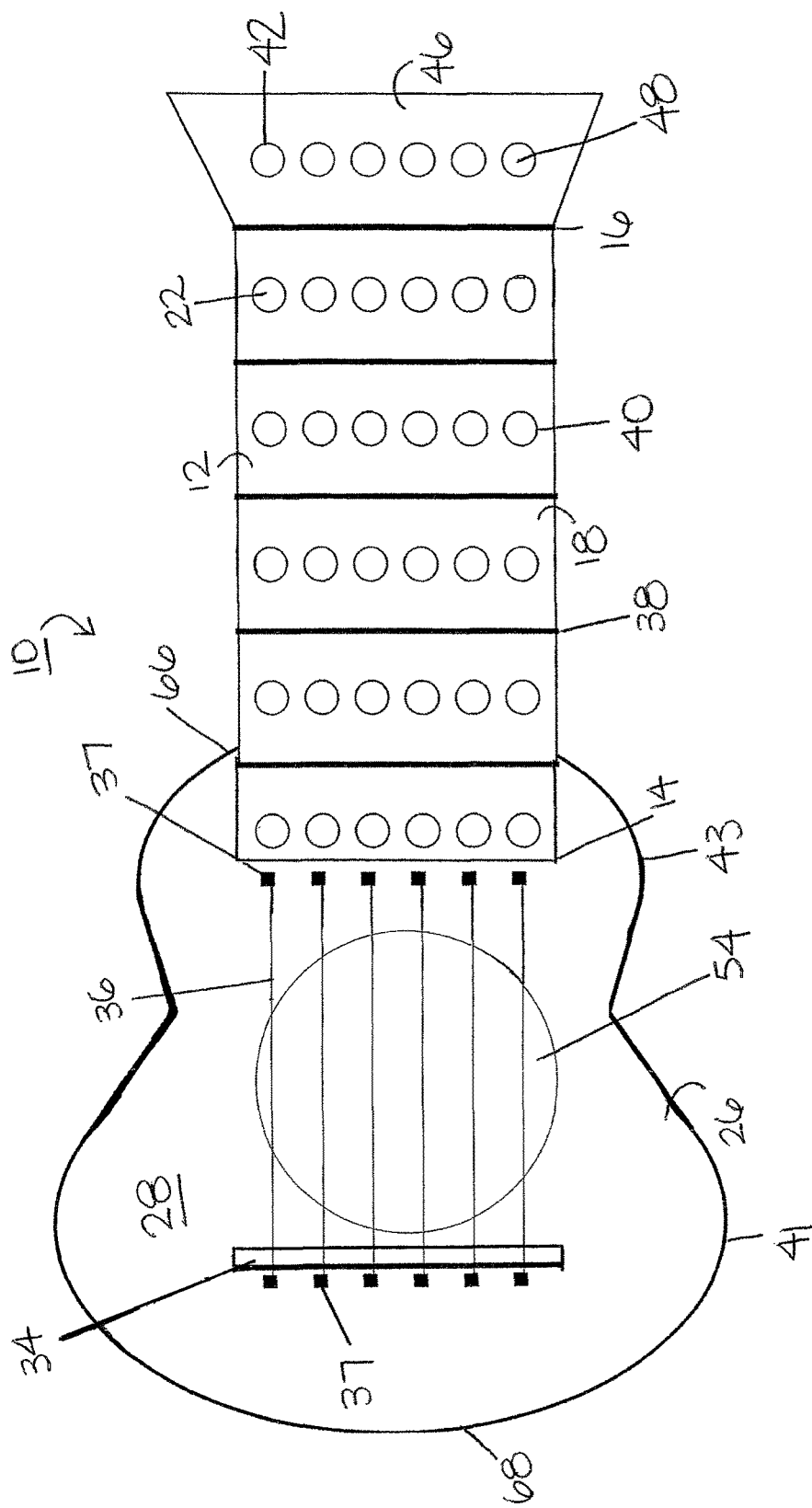
FIG. 6 is a front elevation view of another embodiment of a string instrument chord teaching device.
Figure 7:
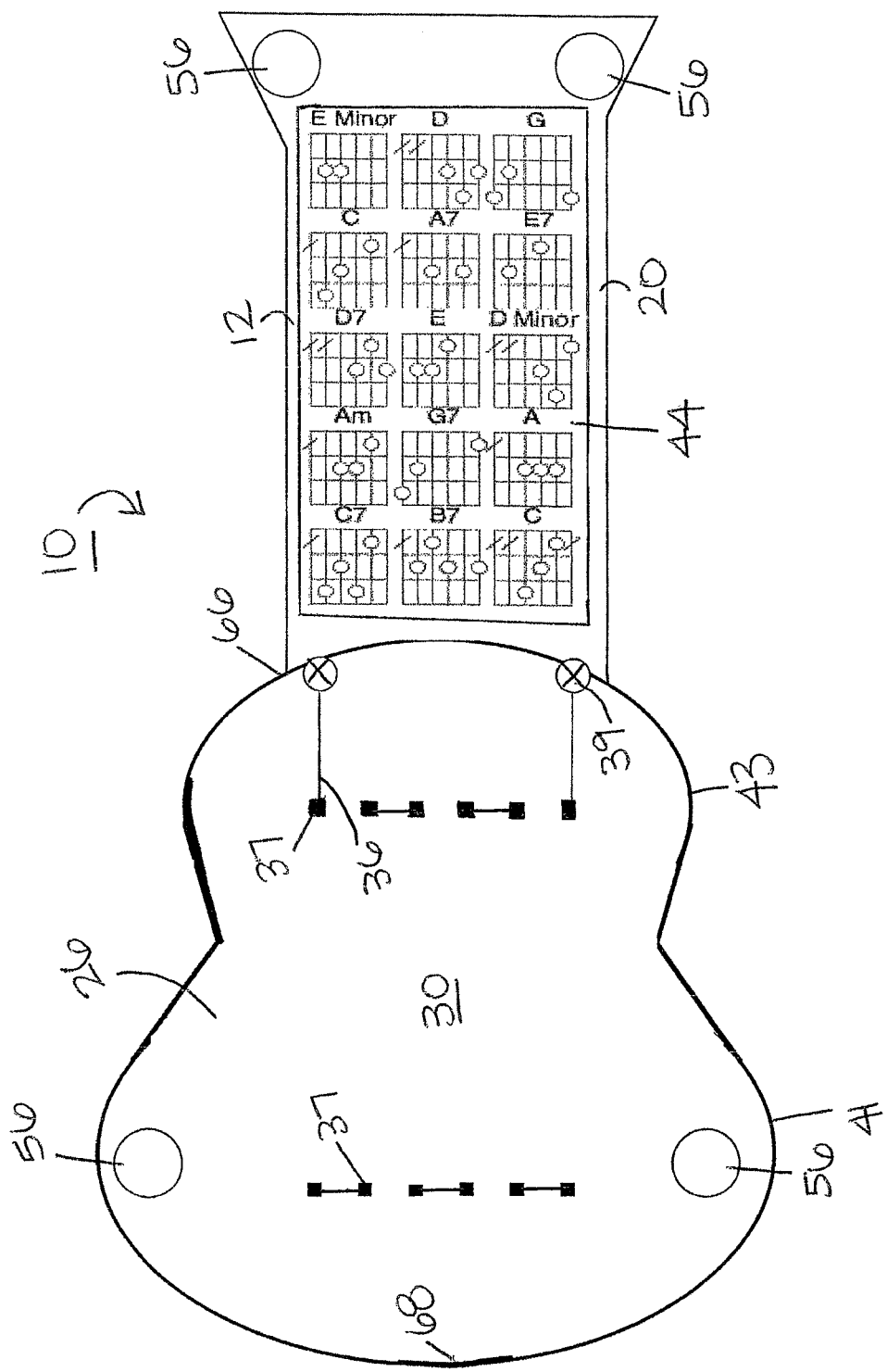
FIG. 7 is a back elevation view of the embodiment of a string instrument chord teaching device shown in FIG. 6.

In exemplary embodiments of the teaching device 10 shown in FIGS. 1-5 and in FIGS. 6 and 7, where common elements have common part numbers, such as where there is a body portion 26 and a neck member 12, and where the teaching device may be used to teach young children, the teaching device may be generally flat, and can be on the order of about 0.5 inch (about 1.3 cm), where the body portion 26 has a length of about 5 inches (about 12.7 cm), a maximum width at a first bout portion 41 of about 5 inches (about 12.7 cm), a narrow waist portion of about 3 inches (about 7.6 cm) in width, and a width at a second bout portion 43 at a location before the body portion joins the neck member 12 of about 3.75 inches (about 9.5 cm). The neck member may be about 4 inches (about 10.2 cm) long and about 2.25 inches (about 5.7 cm) wide, and the neck may terminate at its distal end 16 in a head portion 46 that may be about 1 inch (about 2.5 cm) in length and about 3 (about 7.6 cm) inches wide. It must be emphasized that the teaching device of this invention can have any suitable shape or dimensions to simulate a string instrument of interest, keeping in mind the student or user who will likely use the teaching device.

The teaching device 10 may further comprise one or more bridges 32, 34 for strings 36 on a front surface 28 of the body portion 26. As shown in the first embodiment of FIGS. 1-5, there are two bridges 32, 34 shown schematically to represent bridges used either with a string instrument to be played without a bow, such as a guitar, or a string instrument to be played with a bow, where the bridges for a string instrument to be played with a bow would be shaped differently, as the bridges are formed on a violin, cello or the like. The strings generally are for purposes of providing a simulated look and somewhat of a simulated feel of a desired string instrument, and could be strummed, plucked or even bowed in a manner generally like a student or user may do for a real string instrument. However, the strings need not be and typically are not tuned or tunable, as they are preferably primarily for aesthetic purposes, too.

Figure 2:
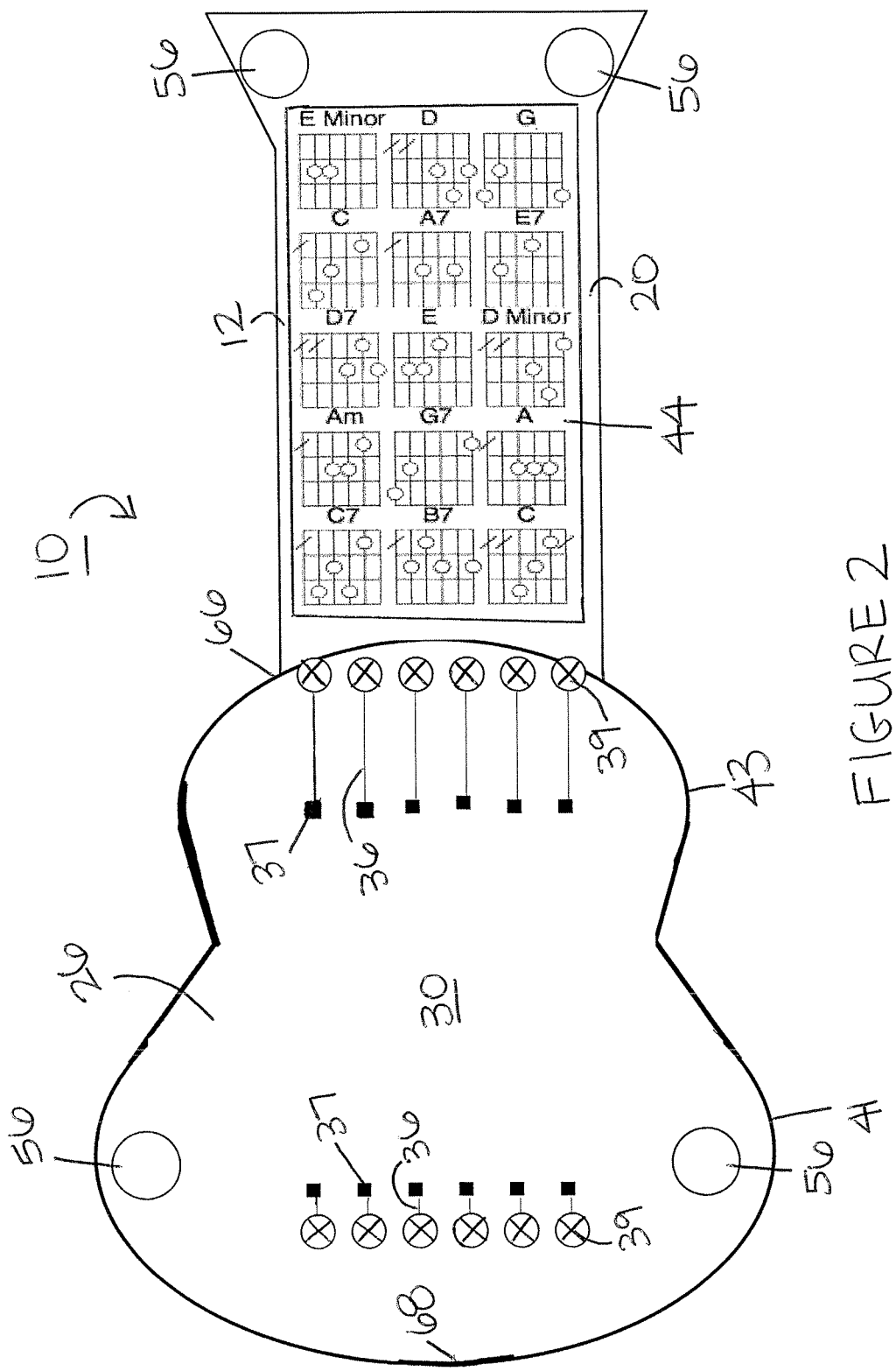
FIG. 2 is a back elevation view of a string instrument chord teaching device.

In one embodiment shown best in FIGS. 1-3, 4B and 5, the teaching device 10 comprises two bridges for strings, wherein a first bridge 32 may be on a front surface 28 of a first end 66 of the body portion 26 adjacent to the proximal end 14 of the neck member 12, and a second bridge 34 may be aligned with, but remote from, the first bridge 32, and located on the front surface 28 adjacent to a second end 68 of the body portion 26. In another embodiment, shown in FIG. 6, the teaching device 10 comprises one bridge 34 for string segments 36 located on the front surface 28 adjacent to the second end 68 of the body portion 26. The bridges 32, 34 or just bridge 34 are preferably each located adjacent a set of through holes 37 extending from the front surface 28 to the back surface 30 of the body portion 26, for threading the strings or string segments 36. If desired, and as shown in FIG. 6, in one embodiment the teaching device comprises one bridge 34, and one set of through holes 37, remote from the bridge 34, and adjacent to the second end 68 of the neck member 66. In another embodiment in which the teaching device does not comprise any bridges, a first and second set of through holes 37 are located where the bridges 32, 34 would otherwise be located. The bridges 32, 34 may be raised bars, such as dowels, that extend from the front surface 28 of the body portion 26 so that strings 36 supported by the bridges are spaced from the front surface 28 of the body portion, and may be attached to the body portion 26 with adhesive, screws, nails or any other fasteners for attaching bridges 32, 34 to the front surface 28 of the body portion 26. The strings 36 may pass over and be supported by the bridges 32, 34 and as best shown in FIGS. 1 and 2, may pass through the through holes 37 in the body where they may be wound around or through transverse holes (not shown) in posts of screws 39, as best shown in FIG. 2, so that the strings can be tightened.

In one embodiment shown best in FIG. 2, the teaching device 10 comprises one or more screws 39 for each string 36 present on the teaching device, corresponding to the number of strings that would be present in the string instrument for which the invention is configured to teach. For example, a six string guitar may comprise twelve screws 39, two screws 39 for each string 36. In another embodiment, the teaching device 10 may comprise less than one screw 39 for each string 36 represented on the body of the teaching device. The plurality of strings may be any number of independent strings as shown best in FIGS. 1 and 2, or one string wound through the first and second set of through holes 37, shown best in FIGS. 6 and 7, so as to resemble a number of independent strings on the front surface. For example, as shown best in FIG. 7, the one string 36 could be anchored at one end around one screw 39 and wound through the first and second sets of six through holes and anchored at its other end by another screw 39, effectively creating six string segments on the front surface of the body portion as shown best in FIG. 6. Either or both screws 39 shown in FIG. 7 could be tightened to tension the string 36 to any desired tension.

In one embodiment, the teaching device 10 may, but need not, further comprise a simulated sound hole 54 formed in or on the front surface 28 of the body portion 26. The simulated sound hole 54 may be integrally and unitarily molded as part of the body portion or may be drilled or carved into the body portion or may be a decal or printed, painted or otherwise marked on the body portion. In place of or within or on the simulated sound hole, the teaching device may comprise a design or logo decal or printed, painted, or otherwise marked design or logo. One embodiment of the teaching device 10, best shown in FIG. 6, comprises a first set of through holes 37, a bridge 34, and a simulated sound hole 54 or other design centrally located on the front surface 28 of the body portion 26 between the first set of through holes 37 and the bridge 34. A further embodiment of the teaching device 10, best shown in FIGS. 1-3, 4B and 5, comprises two bridges 32, 34 and further comprises a simulated sound hole 54 or other design located between the two bridges 32, 34 on the front surface 28 of the body portion 26. The teaching device 10 may further comprise a choking hazard message relating to the use of the pegs 24. The choking hazard message may be a decal or printed, painted, stamped, or otherwise marked for parents or teachers of young children, located anywhere on the teaching device. The hazard message is preferably located on the back surface 30 of the body portion 26.

The teaching device 10 may further comprise a plurality of strings 36 or a single wound string as explained above to provide a plurality of string segments on the front surface 28 of the body 26 extended between the two bridges 32, 34 or between one bridge 34 and a set of through holes 37, or extended between a first and second set of through holes 37. In one embodiment the strings 36 are extended over the simulated sound hole 54 or other design. In a preferred embodiment, the number of strings 36 corresponds to a number of columns 42 of holes 22 in the front surface 18 of the neck member 12, each column 42 comprising a plurality of holes 22 extending from the proximal end 14 to the distal end 16 of the neck member 12. Preferably, the teaching device 10 is configured to comprise a number of columns 42 of holes 22 corresponding to the number of strings that would be present in the string instrument for which the invention is configured to teach. As an exemplary embodiment, a teaching device configured to teach chords of a six string guitar may comprise six columns of holes and six strings on the front surface 28 of the body portion 26.

In one embodiment, the teaching device 10 comprises more than one row 40 of holes 22 on the front surface 18 of the neck member 12, wherein each row 40 of holes 22 may be located between two frets 38 or between a fret 38 and the first bridge 32. In a further embodiment, the teaching device 10 comprises at least two rows 40 of holes 22. In a preferred embodiment, the teaching device 10 comprises at least three and more preferably at least four, and most preferably five or more rows 40 of holes 22.

The teaching device 10 may further comprise a head portion 46 adjacent to the distal end 16 of the neck member 12. The head portion 46 may include peg storage holes 48 for storing the pegs 24 while one or more pegs 24 are not in use. FIGS. 4B and 5 are front elevation views of one embodiment of the teaching device 10, wherein the one exemplary peg 24a is stored in the peg storage holes 48 in the head portion 46 in FIG. 4B, while four pegs 24 are stored in the peg storage holes 48 in the head portion 46 in FIG. 5. The teaching device 10 may further comprise a compartment for storing pegs 24 located anywhere else in or on the teaching device 10.

In another embodiment, sensors, for instance electronic sensors (not shown), could be used with each of the holes 22 formed in the neck member 12. These sensors sense into which holes 22 the pegs 24 are placed and preferably when the pegs are depressed by a student's finger. These sensors are also electrically or electronically interconnected with other sensors (not shown) associated with the strings 36, such as near the simulated sound hole 54. The sensors associated with the holes 22 and strings 36 may be wired or wireless and connectable to send signals corresponding to the peg location and the plucking, strumming or bowing of the strings to an electronic sound generator (not shown), such as an amplifier and a speaker (not shown), to generate the sound of the chord that would be made and activated when the strings 36 are plucked, strummed or bowed. The amplifier and speaker may be a part of or remote from the teaching device 10. Thus, in this embodiment, even though the strings do not extend along the length of the neck member 12, a more realistic sound corresponding to the chord that is made by the placement and preferably the depression of the pegs 24, may result, rather than a typically untuned and not truly realistic sound made when the strings 36 are plucked, strummed or bowed without such sensors and the associated sound generator. In this embodiment the teaching device may be battery powered or may further include a power cord for connecting to an outside power source, such as an electrical outlet or even a USB connector for connection to a computer or other device providing power through the USB connection.

Furthermore, since the teaching device 10 may be flat with a flat back surface comprising neck member back surface 20 and body portion back surface 30, feet 56, such as rubber, polymeric plastic or felt pads, may be attached to on the back surface 20 of the neck member 12 and/or on the back surface 30 of the body portion 26. The feet 56 may be any shape and size, and may be attached to the back surface of the teaching device by any suitable adhesive, by screws or nails having a head within an indentation of the feet, or in any other suitable manner. By including feet 56 on the back surface, the teaching device will be easier to pick up when resting on a table, desk, bench, floor or the like, and will help reduce marring of the surface of the table, desk, bench, floor or the like.

Furthermore, the teaching device 10 may comprise a chord chart 44, wherein the chord chart may be attached to the teaching device 10. FIG. 2 is a back elevation view of one embodiment of the teaching device 10. In a preferred embodiment, such as the embodiment depicted in FIG. 2, the chord chart 44 is attached to the back surface 20 of the neck member 12, typically by any suitable adhesive. The chord chart 44 comprises one or more schematic diagrams of specific chords intended to be taught to the student, such as the schematic diagram depicted in FIG. 4A. The schematic diagram preferably comprises a name indicator 58 for identifying the depicted chord and one or more peg indicators 60, each peg indicator 60, such as peg indicators 60b, 60c and 60d, being identifiable with a peg 24, such as corresponding pegs 24b, 24c and 24d as shown in FIG. 4B, wherein each peg 24 is identifiable with a finger for proper finger placement by the student to finger chords. Preferably, the peg indicators 60, such as peg indicators 60b, 60c, and 60d will have the same identifying information as the corresponding pegs 24, such as pegs 24b, 24c and 24d, for instance the same identifying colors, patterns, cross-sectional shape or even tactile feel. The schematic diagrams on the chord chart 44 preferably also includes a grid, wherein the grid comprises string indicators 62 depicting possible string locations, and fret indicators 64 depicting possible fret locations associated with the string instrument which the student is learning to play.

In another embodiment, the chord chart 44 may be replaced with or also accompanied by chord flash cards, wherein each flash card comprises one schematic diagram of a specific chord. In one embodiment the chord chart 44 or one or more chord flash cards are laminated.

A second aspect of the invention relates to a kit comprising more than one teaching device of the first aspect of the invention. Teaching devices of any embodiment as previously described may be included in the kit. Additionally the more than one teaching device in the kit need not be the same embodiment of the teaching device. The kit may comprise chord charts optionally attached to the one or more teaching device, or may comprise chord charts in the form of chord flash cards, or a combination of both. The kit may further comprise one or more picks. Furthermore, the kit may comprise instructions for using the teaching device. The kit may further comprise a hazard message for parents or teachers of young children, for example a choking hazard message.

In a preferred embodiment, the one or more teaching devices comprised in the kit may be differentiated devices. Specifically, the one or more teaching devices may be different colors. The one or more teaching devices may further be different sizes, or may be configured to represent different versions of the same string instrument or different string instruments. The kit may further comprise picks identifiable with each teaching device, for example by color that may correspond with and be the same color as the counterpart teaching device, such as the color of the body portion 26 of the counterpart teaching device 10.

The kit can and preferably also would include instructions for using the teaching device 10 and the other components of the kit, for example in accordance with a teaching method according to the invention as described below.

A further aspect of the invention relates to a method of teaching chords for a string instrument to at least one student. The method comprises providing the student with a teaching device as previously described, providing the student with a chart of one or more chords in the form of a chord chart or chord flash cards as previously described, instructing the student to place pegs in the holes in the neck member corresponding to the proper peg placement as shown in the chart, and instructing the student to place a finger over the peg identifiable with the corresponding finger to be used to form the chord.

Figure 4A:
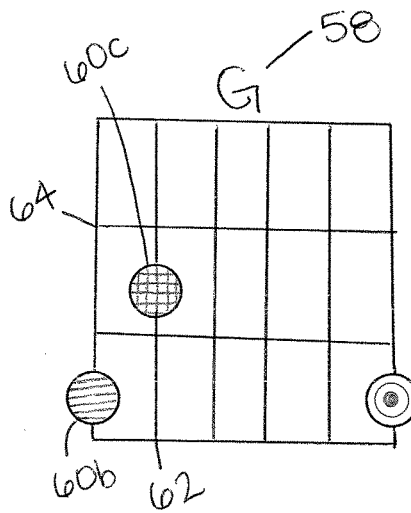
FIG. 4A is a schematic diagram of one exemplary chord, wherein a chord chart and/or chord flash cards may comprise one or more diagrams of a chord.
Figure 4B:
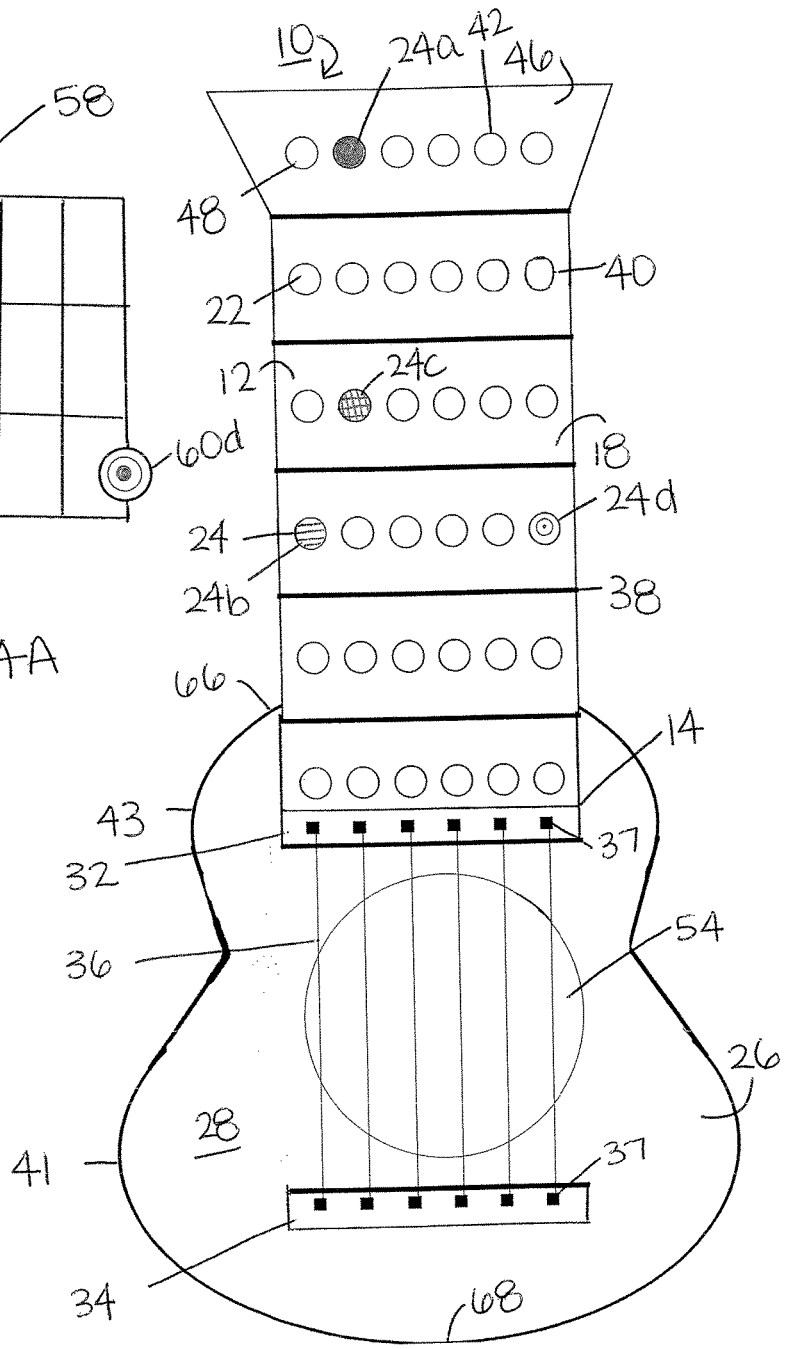
FIG. 4B is a front elevation view of a string instrument chord teaching device, wherein pegs are exemplary shown as correctly retained in holes in the front surface of the neck member for properly fingering the exemplary chord represented in FIG. 4A.

An exemplary embodiment of the method can be further described using the particular embodiments of the invention depicted in FIGS. 4A and 4B. FIG. 4A is a schematic diagram of a chord that may be included in a chord chart or depicted on a chord flash card. The example chord in FIG. 4A is the G major chord. Peg indicators 60, for instance peg indicators 60b, 60c and 60d represent correct finger placement by a user of the teaching device 10 to finger the G major chord, with respect to string indicators 62 and fret indicators 64. FIG. 4B is a front elevation view of the teaching device 10, wherein pegs 24b, 24c and 24d are properly placed by the user to correspond to the respective peg indicators 60b, 60c and 60d in the diagram for the G major chord in FIG. 4A. An additional peg 24a is not currently being used, and can be seen stored in any of the peg storage holes 48 in the head portion 46 of the teaching device 10. Each peg 24 is further identifiable with a finger. Upon properly placing the pegs 24b, 24c and 24d, i.e. not peg 24a, in the holes 22 in the neck member 12, as shown in FIG. 4B, the student will further be instructed to place a properly identified finger over each peg 24. Upon placing properly identified fingers on each peg 24 in use, the student will be in a position to properly finger the G major chord. Thus, as shown in FIGS. 4A and 4B, and using the exemplary color coding described above for indicating which pegs 24 and peg indicators 60 in the schematic diagram correspond with the appropriate fingering, the student's middle finger would be placed over the green peg 24b corresponding to the green peg indicator 60b, the student's pointer finger would be placed over the red peg 24c corresponding to the red peg indicator 60c and the student's ring finger would be placed over the blue peg 24d corresponding to the blue peg indicator 60d.

The method may further be used to teach more than one student chords for a string instrument, wherein each student may be provided with a teaching device as previously described and a chart of one or more chords, in the form of a chord chart or chord flash cards or both as previously described, and may further be instructed to follow the method as previously described. Each student may further be provided with a pick used to strum the stings 36 to provide some degree of simulated realism to playing a guitar. The degree of realism may be enhanced if the student holds the teaching device 10 as he or she would if playing a real guitar. Similar scenarios and methods apply to teaching chords for other string instruments.

In one embodiment of the method to teach more than one student, each student may be provided with a differentiated device being visually distinguishable from the other student's teaching device, as previously described, such as a device of a different color. Further each pick provided to a student may be identifiable with the differentiated device, such as a pick that is the same color as the teaching device.

In another embodiment of the method to teach more than one student, the students being taught can be in a race to properly finger a chord called out by the teacher. For example, the winner may be the student who first properly places a peg 24 in the proper hole 22 in the neck member 12 corresponding to the peg indicators 60 of the schematic diagram of the chord chart or a flash card. Alternatively, the winner could be the student who correctly places the appropriate finger over each properly correspondingly placed peg 24. In a further embodiment, each student may race to strum the strings, with or without a pick in different embodiments, after correctly placing each finger over each properly placed peg first. Other teaching techniques could be employed using the basic teaching method and the teaching device of the present invention as would be apparent to music teachers teaching students to play string instruments.

It will be appreciated by those skilled in the art that changes could be made to the embodiments described above without departing from the broad inventive concept thereof. It is understood, therefore, that this invention is not limited only to the particular embodiments disclosed, but it is also intended to cover modifications within the spirit and scope of the present invention as defined by the appended claims.

I claim:

1. A string instrument chord teaching device that is not tuned or tunable comprising:
    a one-piece base comprising a neck member and a body portion integrally and unitarily formed with the neck member, the neck member having a proximal end and a distal end, a front surface and a back surface, the body portion having a first end and a second end, the first end of the body portion being adjacent to the proximal end of the neck member;
    holes in the front surface of the neck member arranged in an array of rows and columns corresponding to possible finger placement by a user to finger chords, and
    pegs capable of being frictionally retained in and completely removable from one or more of the holes in the front surface of the neck member to be placeable in one or more of other of the holes, placement of the pegs in the holes representing chords to be learned, each peg being identifiable with a finger for fingering the chord.

2. The string instrument chord teaching-device as in claim 1, wherein the body portion resembles a string instrument.

3. The string instrument chord teaching device as in claim 1, further comprising frets on the front surface of the neck member.

4. The string instrument chord teaching device as in claim 3, further comprising at least three rows of holes, each row of holes located between two frets or between a fret and a first set of through holes, wherein a number of columns of holes per row corresponds to a simulated number of string locations.

5. The string instrument chord teaching device as in claim 1, further comprising a chord chart attached to the device.

6. The string instrument chord teaching device as in claim 5, wherein the chord chart is attached to the back surface of the neck member.

7. The string instrument chord teaching device as in claim 1, further comprising a head portion at the distal end of the neck member.

8. The string instrument chord teaching device as in claim 7, further comprising holes in a front surface of the head portion for storing the pegs when the pegs are not placed in the holes elsewhere in the neck.

9. A kit comprising more than one string instrument chord teaching device as in claim 1, and a chord chart for each string instrument chord teaching device.

10. The kit of claim 9, wherein the string instrument chord teaching devices are differentiated devices, each string instrument chord teaching device being visually distinguishable from the other string instrument chord teaching devices in the kit.

11. The kit of claim 9, further comprising chord flash cards.

12. The kit of claim 9, further comprising instructions.

13. A method of teaching chords for a string instrument to at least one student comprising:
providing the student with a string instrument chord teaching device as in claim 1,
providing the student with a chord chart of one or more chords, the chord chart comprising indicators for proper finger placement by the student to finger chords, each indicator being identifiable with a peg,
instructing the student to place pegs in the holes in the neck member, corresponding to the proper peg placement as shown in the chord chart to finger a chord, and
instructing the student to place a finger over each peg, each peg being identifiable with a finger, such that the placement of the fingers over the pegs corresponds to correctly fingering the chord.

14. The method according to claim 13, wherein more than one student are taught chords for a string instrument, each student being provided with a string instrument chord teaching device and a chord chart of one or more chords.

15. The method according to claim 14, wherein the string instrument chord teaching devices are differentiated devices, each string instrument chord teaching device being visually distinguishable from the other string instrument chord teaching devices in the kit.

16. The method according to claim 14, wherein at least one student is further provided with chord chart flash cards.

17. The method according to claim 14, wherein the more than one student race to properly place a finger over each peg first.

18. The method according to claim 13, wherein the pegs are distinguishable from each other and correspond to different fingers to be used when the user fingers the chord.

19. The string instrument chord teaching device as in claim 1, wherein the pegs are distinguishable from each other.

20. A string instrument chord teaching device comprising:
a neck member having a proximal end and a distal end, a front surface and a back surface,
holes in the front surface of the neck member arranged in an array of rows and columns corresponding to possible finger placement by a user to finger chords, and
pegs capable of being frictionally retained in and removable from the holes, each peg being identifiable with a finger for fingering the chord,
further comprising a body portion having a first end and a second end and resembling a string instrument, the first end of the body portion being adjacent to the proximal end of the neck member, and
further comprising a first set of through holes for strings or string segments, the first set of through holes extending through the body portion from the front surface to the back surface of the body portion adjacent to the first end of the body portion and adjacent to the proximal end of the neck member, a second set of through holes for strings or string segments aligned with, but remote from, the first set of through holes, the second set of through holes extending through the body portion from the front surface of the body portion to the back surface of the body portion adjacent to the second end of the body portion.

21. The string instrument chord teaching device as in claim 20, further comprising one or more bridges located adjacent to one or more set of through holes and a plurality of strings or string segments adjacent the front surface of the body portion extended between the two sets of through holes, the plurality of strings or string segments corresponding to a number of columns of holes in the neck member.

22. The string instrument chord teaching device as in claim 21, further comprising a sensor associated with each hole, a sensor associated with the strings or string segments, and a sound generator associated with the sensor associated with each hole and also associated with the sensor associated with the strings or string segments, the sensor associated with each hole being capable of determining when a peg is placed in the hole when the peg placed in the hole is depressed by a student's finger and sending a corresponding signal to the sound generator, and the sound generator being capable of receiving signals from the sensor associated with each hole and the sensor associated with the strings or string segments, whereby the sound generator generates a sound corresponding to notes forming a chord based on the pegs being depressed when the strings or string segments are being plucked, strummed or bowed.

* * * * *